United States Patent [19]

Humpleman

[11] Patent Number: 4,691,294

[45] Date of Patent: Sep. 1, 1987

[54] CLOCK/DATA SYNCHRONIZATION INTERFACE APPARATUS AND METHOD

[75] Inventor: Richard J. Humpleman, Stoke-on-Trent, England

[73] Assignee: International Computers Limited, London, England

[21] Appl. No.: 776,823

[22] Filed: Sep. 17, 1985

[30] Foreign Application Priority Data

Sep. 21, 1984 [GB] United Kingdom ............... 8423968

[51] Int. Cl.⁴ .......................................... G06F 13/00
[52] U.S. Cl. ................................. 364/900; 370/103
[58] Field of Search ............... 364/200 MS, 900 MS; 340/825.2, 825.21, 825.14; 370/100, 103; 375/106, 107, 109; 371/61; 365/233

[56] References Cited

U.S. PATENT DOCUMENTS

| | | | |
|---|---|---|---|
| 3,801,981 | 4/1974 | Alpers | 375/109 X |
| 3,936,604 | 2/1976 | Pommerening | 370/103 X |
| 3,940,558 | 2/1976 | Gabbard et al. | 370/103 X |
| 3,992,580 | 11/1976 | Bittel et al. | 370/103 X |
| 4,156,798 | 5/1979 | Doelz | 364/200 |
| 4,208,724 | 6/1980 | Rattlingourd | 364/900 |

FOREIGN PATENT DOCUMENTS 2336009  7/1977  France ............................ 375/109

OTHER PUBLICATIONS

IBM Tech. Discl. Bull.; "Clock Generator Circuit", by Y. K. Puri et al.; vol. 25, No. 9, Feb. 1983, pp. 4505-4507.

Primary Examiner—Archie E. Williams, Jr.
Assistant Examiner—William G. Niessen
Attorney, Agent, or Firm—Lee, Smith & Zickert

[57] ABSTRACT

In order to synchronize data signals transferred from a source unit to a destination unit, a clock signal is transmitted from the destination unit to the source unit and transmission of data is effected under control of the received clock signal. The received clock signal is retransmitted back to the destination unit with the trasmitted data and is used to register receipt of the data.

6 Claims, 4 Drawing Figures

CLOCK/DATA SYNCHRONIZATION INTERFACE APPARATUS AND METHOD

BACKGROUND TO THE INVENTION

This invention relates to data transfer systems, especially such as may be used for input and/or output operations between a computer processor and a computer peripheral.

In such systems data is transferred from a source unit to a destination unit over a signal path connecting the two units. As the rate of data transfer increases, the delay introduced by the signal path becomes significant and creates uncertainty in the timing relationships between the two units. This uncertainty causes difficulties in synchronizing and controlling the flow of data.

SUMMARY OF THE INVENTION

According to the invention there is provided a method of transferring information from a source unit to a destination unit, which method comprises:

providing a reference clock signal in the destination unit, transmitting a clock signal synchronized with the reference clock signal from the destination unit to the source unit over a first clock-signal path, receiving the clock signal transmitted over the first clock signal path at the source unit and retransmitting a clock signal synchronized with it from the source unit to the destination unit over a second clock signal path, transmitting a data request signal from the destination unit to the source unit, the data request signal being synchronized with the said reference clock signal, detecting the receipt of the data request signal at the source unit at a time synchronized with the clock signal received at the source unit from the first clock signal path and in response to that detection and synchronized with the clock signal received from the first clock signal path transmitting from the source unit to the destination unit both a signal indicating data transmission and a data signal, and detecting in the destination unit at a time synchronized with the clock signal received from the second clock signal path the said signal indicating data transmission and in response to that detection registering the data signal.

The requests allow the destination unit to control transmission of the data and the destination units detects when the data arrives, even though that may be after an arbitrary delay, from the signal indicating data transmission. Uncertainty in the timing relationships between the source and destination are overcome because the requests are synchronized with a clock signal supplied from the destination to the source, and the data signals are synchronized with a related clock returned with the data to the destination.

There is also provided according to the invention a data transfer system for transmitting data from a source unit to a destination unit and comprising:

interface apparatus for the source unit, interface apparatus for the destination unit, and a plurality of signal paths interconnecting the said interface apparatuses, which plurality comprises a first clock signal path, a second clock signal path, a data request signal path, a path for a signal indicating data transmission, and a data signal path, the interface apparatus for the destination unit comprising means for providing a reference clock signal, means coupled to the last-mentioned means for transmitting onto the first clock signal path a clock signal derived from the reference clock signal, means operating under timing control derived from the reference clock signal for outputting a data request signal onto the data request signal path, means coupled to the path for the signal indicating data transmission and operating under timing control derived from the clock signal received from the second clock signal path for detecting the signal indicating data transmission and arranged in response thereto to output a control signal, and means coupled to the data signal path and responsive to the said control signal to register data received on the said data signal path under timing control derived from the signal received from the second clock signal path, and the interface apparatus for the source unit comprising, means coupled to the first clock signal path for receiving the clock signal transmitting over that path, means coupled to the last-mentioned means for transmitting over the second clock signal path a clock signal derived from the clock signal received from the first clock signal path, means coupled to the data request signal path and operating under timing control derived from the clock signal received from the first clock signal path for detecting a data request and outputting a control signal or signals in response thereto, means responsive to a said control signal from the detecting means for outputting signals indicating data transmission over the path therefor under timing control derived from the clock signal received from the first clock path, and means responsive to a said control signal from the detecting means for outputting a data signal over the data signal path under timing control derived from the clock signal received from the first clock signal path.

The invention further provides interface apparatus suitable for forming the interface apparatus for a source unit in a data transfer system according to the invention. It also provided interface apparatus suitable for forming the interface for a destination unit in such a system.

Preferably the interface apparatus for the destination unit transmits a control signal to the interface apparatus for the source unit for enabling or disabling the outputting of the said data request signals.

The data request signals and signals indicating data transmission may include signals which indicate the start and end of data sequences.

Preferably the interface apparatus for the source unit has means for storing an indication of requests for data it is unable to fulfill and outputs data to fulfill these requests when able to do so.

BRIEF DESCRIPTION OF THE DRAWINGS

An interface system constituting one example of a data transfer system in accordance with the invention will now be described in greater detail with reference to the accompanying drawings, in which.

DESCRIPTION OF AN EMBODIMENT OF THE INVENTION

OUTLINE OF THE INTERFACE SYSTEM

Figure 1:
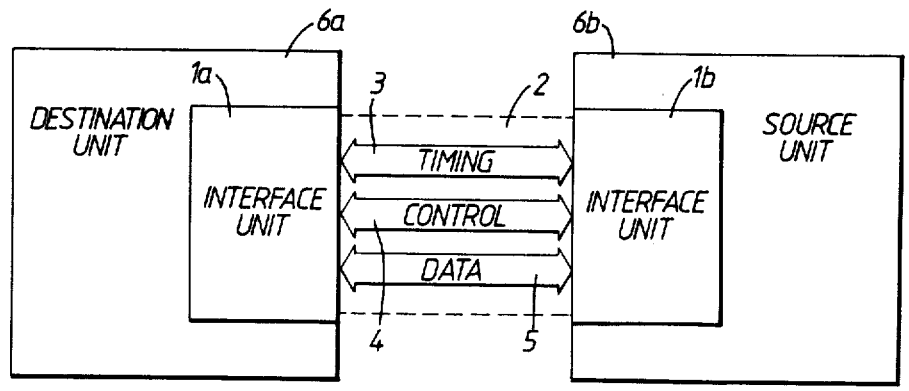
FIG. 1 is a general block diagram of the interface system.

Referring to FIG. 1, the essentail elements of the interface system forming this example of data transfer apparatus in accordance with the invention consist of two interface units 1a and 1b and a set of connections 2 between them. These connections consist of timing connections 3, control connections 4 and data connections 5. The function of the apparatus is to transfer data to a destination unit 6a containing the interface unit 1a from a source unit 6b containing the interface unit 1b.

The data is supplied across the connections 5 in parallel, a word at a time. For example, a word may contain 32 data bits and four parity bits, the connections 5 containing 32 data lines and four parity lines.

In operation the destination interface unit 1a issues a separate request for each word to be supplied. The source interface unit 1b meets each request, normally as soon as it receives it, by sending a word of data, but the destination interface unit 1a does not need to wait for receipt of the word before issuing the next request. When data is travelling at the peak rate there will normally be several requests out-standing which are accounted for by the delay represented by the connections 2 between the two units. The system is designed to be able to transfer data in blocks each consisting of a number of consecutively transferred words.

EXAMPLE OF OVERALL SYSTEM EMPLOYING THE INTERFACE SYSTEM

Figure 2:
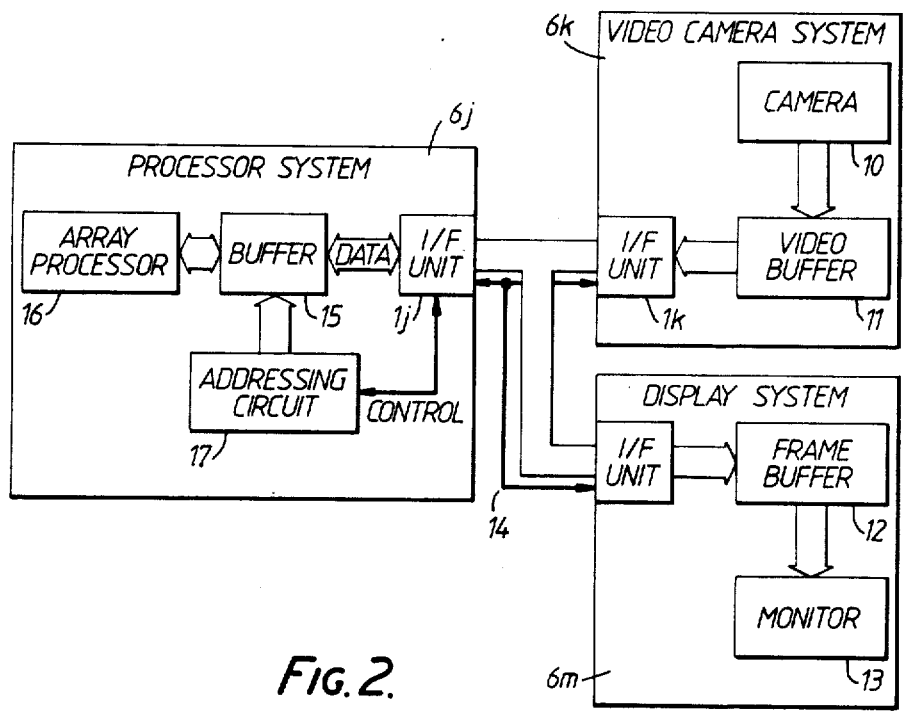
FIG. 2 shows one example of an overall system including the interface system.

In order to explain further the characteristics of the interface system of FIG. 1, one particular example of an overall system in which it may be used will now be described with reference to FIG. 2. The system is for real-time image processing and has three units between which data transfer takes place, a processor system 6j, a video camera system 6k and a display system 6m. The processor system 6j has an interface unit 1j which is capable of acting as either a source interface unit 1b or a destination interface unit 1a. The camera system 6k has a video camera 10, a video buffer 11 and an interface unit 1k which acts only as a source interface unit 1b. The display system 6m has an interface unit 1m that acts only as a destination interface unit 1a, a frame buffer 12 and a raster-scanned monitor 13 refreshed from the frame buffer 12.

In this overall system the processor system 6j is the master and the other two units 6k and 6m are slaves. The master selects one of the slaves to take part in a data transfer to or from itself by means of a handshaking routine on connections 14; such routines are well known and will not be described further.

The camera 10 generates video data as sequences of multibit words. Each word represents the colour and-/or intensity of one of the picture elements of which the video image can be regarded as made up. Alternatively, the data relating to more than one picture element may be contained in each word. Each sequence contains the data relating to a complete scan of the image and is loaded into the video buffer 11 under timing control derived from the clock driving the camera. The sequence is then output from the buffer using a clock derived from an interface unit 1k and passed across the interface to the interface unit 1j of the processor system 6j.

In the processor system 6j the data is entered into a buffer 15 and passed from there to an array processor 16. The buffer 15 is organized in two halves, one of which is filled under control of a clock signal supplied by the interface unit 1j while the other is emptied under control of a clock signal from the array processor 16. When one half is full and the other emptied the function of the two halves is interchanged. Addressing signals for reading in and writing out the data are supplied by an addressing circuit 17 which increments through the successive locations concerned.

In the array processor 16 the data relating to the frame is subjected to image processing and then returned via the buffer 15 to the interface unit 1j. From there the data is passed across the interface to the interface unit 1m of the display system. That enters the data into the frame buffer 12, from which it is accessed by the monitor 13.

In this system the video data is generated, and needs to be returned, at such a rate that the delays introduced by the connections 2 between the units become appreciable, and can indeed amount to several periods of a clock synchronized with the successive words of the video data. These delays cause problems both in synchronising the transfer of the data and in permitting flow control, especially if operations such as interchanging the function of buffer halves introduces pauses in the supply of or ability to receive data.

STRUCTURE OF THE INTERFACE SYSTEM

Figure 3:
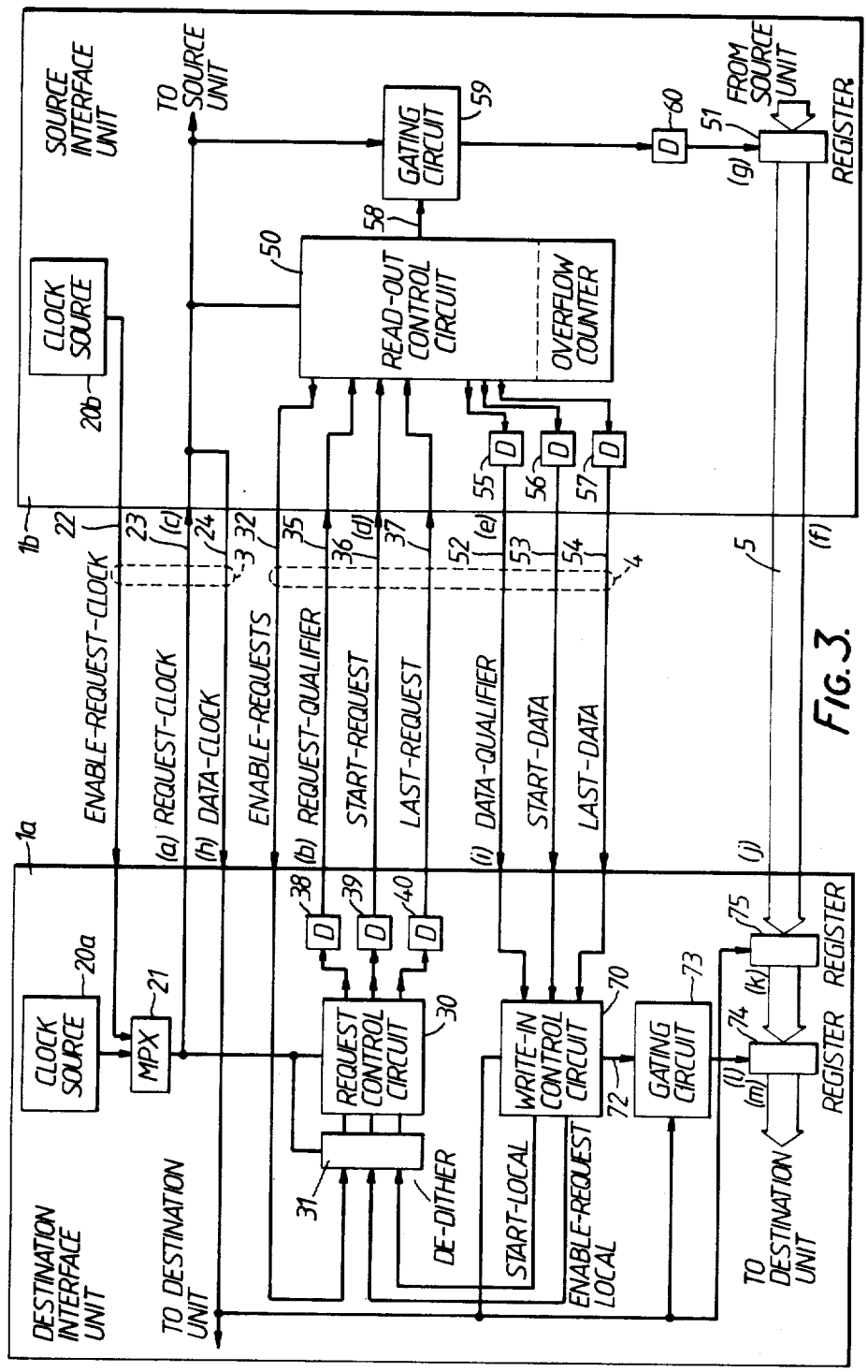
FIG. 3 is a diagram of the interface units of the system together with their interconnections.

The destination interface unit 1a and source interface unit 1b, together with the connections 2 between them, will now be described in greater detail with reference to FIG. 3.

Clock signals

Each interface unit has a clock source, a clock source 20a for the destination interface unit 1a and a clock source 20b for the source interface unit 1b and the destination interface unit 1a selects one of these sources as a basic clock source for the system. This selection is carried out by a multiplexer 21 which selects between first the output of the local clock source 20a, and second the output of the remote clock source 20b, which is received as an ENABLE-REQUESTS-CLOCK signal over a line 22 across the interface. The clock source used determines the peak rate of transfer, so if one unit operates at a slower rate than the other its clock is chosen.

The signal output from the multiplexer 21 is passed to the source interface unit 1b over a line 23. The requests output from the destination interface unit 1a are synchronized with this clock signal, which will be termed the REQUEST-CLOCK signal.

The source interface unit 1b transmits its data in synchronism with this clock signal and also returns the clock signal to the destination interface unit 1a over a line 24 as what will be termed a DATA-CLOCK signal.

It is to be understood that when a signal is said herein to be "synchronized" or in "synchronizm" with a clock signal, what is meant is not necessarily that the signal coincides with one of the timing signals provided by the clock signal, but rather that it bears a predetermined timing relationship with one of these timing signals. This relationship will normally be expressed as a range, to take account of timing tolerances in components involved.

Requests

Requests are issued by a request control circuit 30 in the destination interface unit 1a. Like other control circuits in the interface units yet to be described, the request control circuit 30 is a programmable read-only-memory controlled sequencer. The request control circuit 30 is arranged essentially as a counter that issues a number of requests equal to the number of words in the block to be transferred across the interface. In, for example, an arrangement such as that of FIG. 2, this block will be the data relating to a complete image. The request control circuit 30 is set in accordance with the number of words contained in the block in response to information supplied by the remainder of the destination unit 6a of which the destination interface unit 1a is a part. In a case such as the transfer of a number of successive frames of video data the number set will remain unchanged for the complete transfer.

The request control circuit 30 operates under the timing control of the REQUEST-CLOCK signal output from the multiplexer 21, and in normal operation outputs one request for each beat of this clock. Its operation may be inhibited, and is initiated, by three control signals applied through a de-dither circuit 31. These signals include two that must be present if requests are to be issued. One is an ENABLE-REQUESTS signal which is supplied by the source interface unit 1b over a line 32 if the source unit 6b has data available. The other is an ENABLE-REQUESTS-LOCAL signal which is supplied on a line 33 if the destination unit 6a is able to accept data. Either unit 6a or 6b can therefore exercise flow control and stop the transfer of data (after propagation delays) by dropping the corresponding enable-request signal.

The third control signal is a START-LOCAL signal which is supplied on a line 34 and initiates action of the request control circuit 30 if the other two signals are present.

The START-LOCAL signal resets the counter of the circuit 30 to correspond to the number of words in the block to be transferred, and causes the circuit 30 to issue requests, one for each beat of the REQUEST-CLOCK signal, until a number equalling the number of words in the block has been issued. If either of the enable-request signals is dropped, the output of requests will be halted until it is reasserted.

The request control circuit 30 outputs three qualifier signals, which are transmitted to the source interface unit 1b over lines 35 to 37. For each request it outputs a REQUEST-QUALIFIER signal on the line 35. For the first request of a block it also outputs, simultaneously with the corresponding REQUEST-QUALIFIER signal, a START-REQUEST signal over the line 36. For the last request of the block it similarly outputs, simultaneously with the corresponding REQUEST-QUALIFIER signal, a LAST-REQUEST signal over the line 37.

The connections between the request control circuit 30 and the lines 35 to 37 carrying the request signals each contain a delay, respectively 38 to 40. The function of these delays is to ensure that the request signals are transmitted from the destination interface unit 1a in the desired timing relationship with the timing signals of the REQUEST-CLOCK signal.

The START-REQUEST and LAST-REQUEST signals allow the circuit 50 to check that the blocks it has to send match those requested in length.

Data read-out and transmission

In the source interface unit 1b the request qualifiers on the lines 35 to 37 are recieved by a read-out control circuit 50 which is clocked from the REQUEST-CLOCK signal received over the line 23.

Data to be transmitted from the source interface unit 1b to the destination interface unit 1a is held in a register 51 connected to the lines 5. When data is held in this register the read-out control circuit 50 outputs the ENABLE-REQUESTS signal supplied to the destination interface unit 1b on the line 32.

Receipt of a request by the read-out control circuit 50 causes it (assuming ther register 51 holds a word of data) to output one or more data qualifiers. A DATA-QUALIFIER signal is output on a line 52 for each word in a block. If the word is the first in a block, a START-DATA signal is additionally sent on a line 53. If the word is the last in a block a LAST-DATA signal is additionally sent on a line 54. In order to ensure the desired timing relationship with the REQUEST-CLOCK signal which clocks the circuit 50 from which these signals are output, delays 55 to 57 are included in the connection to the lines 52 to 54.

The data qualifiers when received by the destination interface unit 1a indicate to it that data is being transmitted.

The control circuit 50 also responds to a request by outputting a control signal on a line 58 provided that the source unit 6a has more data available. This signal causes a gating circuit 59 to let through the next timing signal from the REQUEST-CLOCK signal. It is then applied through a delay 60 as a strobe to the register 51 and causes the next word of data to be entered into the register 51.

The REQUEST-CLOCK is supplied to the source unit 6b to provide the timing control for outputting the data.

If the source unit 6a does not have data available the control circuit 50 ceases to assert the ENABLE-REQUESTS signal. When this change is perceived by the request control circuit 30 in the destination interface unit 1a it in turn ceases to send requests. However, owing to propagation and other delays there will be a period after the source interface unit 1b has lowered ENABLE-REQUESTS but before the change is acted on by the request control circuit 30 during which further requests are issued. These requests are received by the read-out control circuit 50 and are counted in a section 61 of the circuit 50 arranged as an overflow counter. When data is again available, the ENABLE-REQUESTS signal is asserted and at the same time data words to fulfill the pending requests are transmitted. New requests arrive just as the count-down ends and a smooth flow of data is obtained thereby.

Receipt of data by destination

Data qualifier signals are output by the source interface unit 1b in synchronism with the REQUEST-CLOCK signal, which is also returned to the destination interface unit 1a as the DATA-CLOCK signal. In the destination interface unit 1a the data qualifiers will still be in synchronism with the DATA-CLOCK signal as received on the line 24. The qualifiers are input to a write-in control circuit 70 which is clocked from the DATA-CLOCK signal, supplied over a line 71. Each DATA-QUALIFIER signal causes a control signal to be output on a line 72 and applied to a gating circuit 73 to allow the next DATA-CLOCK signal to be applied as a data-in strobe to a register 74. The data lines 5 are supplied to this register via a preceding pipeline register 75 clocked from the DATA-CLOCK signal. The data is now registered in the register 74, which buffers it for transfer to the remainder of the destination apparatus using the DATA-CLOCK signal, with which it is in synchronism.

The write-in control circuit 70, checks from the START-DATA and LAST-DATA signals that the received block is of the expected length. It also acts as the interface with the destination unit 6a for control signals and passes the START-LOCAL and ENABLE-REQUESTS-LOCAL signals to the request control circuit 30.

If either end detects that a block sent or requested is not of the expected length it signals to the other end by asserting its outgoing START, LAST and QUALIFIER signals.

Timing and operation

Figure 4:
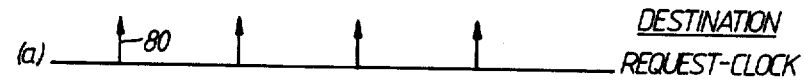
FIG. 4 is a timing diagram showing the sequence of events resulting from a particular request.
Figure 4:
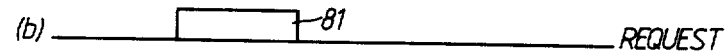
Figure 4:
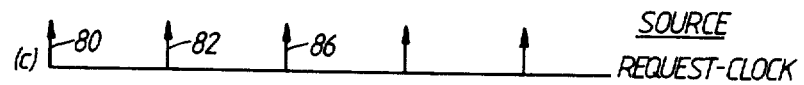
Figure 4:
Figure 4:
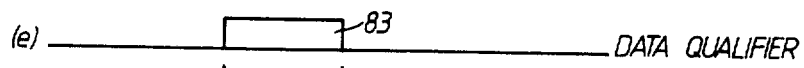
Figure 4:
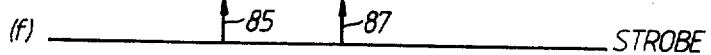
Figure 4:
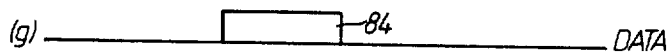
Figure 4:
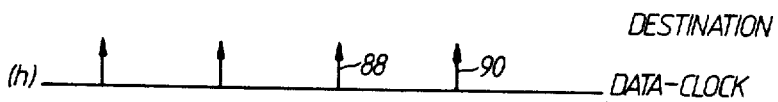
Figure 4:
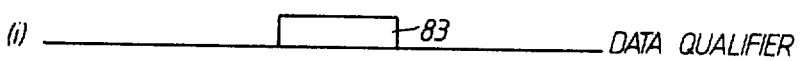
Figure 4:
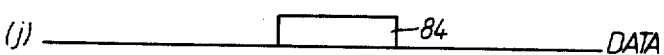
Figure 4:
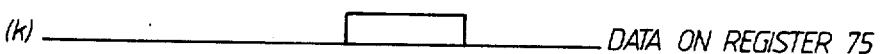
Figure 4:
Figure 4:

The timing sequence of the system will now be described with reference to the waveforms a to 1 of FIG. 4, which apply at the points on FIG. 3 indicated by the letters concerned. The waveforms show the sequence of events associated with one particular request, first in the destination, then in the source and finally again in the destination. FIG. 4 is divided into sections corresponding with each of these stages, and in each section the waveforms are time-aligned, though the sections are not of course time-aligned with one another because of the delays over the lines between the two units.

In this figure each clock signal is shown as a series of arrows, each of which represents one of the timing signals that causes a component to which it is applied to adopt a new state; in practice these signals will be constituted by, say, the rising edge of a square wave.

In the destination interface unit 1a each request qualifier signal (REQUEST-QUALIFIER or START-REQUEST or LAST-REQUEST) is clocked out in response to one of the timing signals of the REQUEST-CLOCK signal. Thus a timing signal 80 (waveform a of FIG. 4) causes a request to be output which, after undergoing delay caused by the appropriate one of delays 38 to 40 is output from the destination interface unit 1a as a signal 81 (waveform b). Although not shown in FIG. 4, the next request will normally be similarly clocked out by the timing signal immediately following the timing signal 80.

In the source interface unit 1b the signals 80 and 81 are received after an arbitrary delay(waveforms c and d). The read-out control circuit 50 is clocked from the REQUEST-CLOCK signal and the next timing signal to be received, a signal 82, causes the request 81 to be input into the control circuit 50. As a result it outputs the DATA-QUALIFIER signal, which after the delay 55 is transmitted as a signal 83 (waveform e). Either of the other data qualifiers, START-DATA or LAST-DATA, will also be transmitted as a similar signal if required. At the same time as the qualifier or qualifiers are being transmitted, the data also being transmitted as a signal 84 (waveform f). This data has already been entered into the register 51 by an earlier timing signal 85.

The control circuit 50 also outputs the control signal which causes a timing signal 86 from the REQUEST-CLOCK signal to be let through and applied, after the delay 60, as a strobe 87 (waveform g) to the register 55. The next word of data is then entered into the register 51. It will be realised that the timing signal 85, though shown as being the preceding beat, may actually have been earlier if the request 81 answered by the data 84 had been the first request to arrive after a pause.

In the destination interface unit 1a the original timing signal 80 will be received again as part of the DATA-CLOCK signal (waveform h). The data qualifier 83 (waveform i) and data signal 84 (waveform j) are also received. The data qualifier 83 is clocked into the write-in control circuit 70 by a timing signal 88 of the data clock. This signal also causes the data to be input into the register 75, which outputs it as a signal 89 (waveform k). The control circuit 70 then outputs the control signal which causes the next timing signal of the DATA-CLOCK signal, a timing signal 90, to be let through as a strobe 91 for the register 74. That then causes the data to be buffered in the register 74 and output as a signal 92 (waveform m).

The function of the register 74 is to preserve the data so it can be entered into the register 75.

It will be understood that a transceiver is included at each end of each line interconnecting the interface units 1a and 1b. These transceivers are not shown in FIG. 3, to avoid complicating the figure, but they and any other components included must of course be taken into account in calculating timings and values of delays to be included. The function of the delays is to ensure that, taking account of component tolerances, signals are established for a sufficient period to allow them to be clocked into the required components.

It will be realised that the way the request clock signal is supplied from the source unit to the destination unit and then returned as a data clock signal allows the two units to operate with an arbitrary propagation delay between them. Requests are clocked out of the destination using the local (request) clcok signal and the resulting data is clocked into it again using the remote (data) clock signal, which need not bear any specified timing relationship in phase or delay with the local clock. The arrival of data at the destination in answer to one of its requests is signalled by a corresponding data qualifier, so the source does not expect any particular time relationship between a request and the resultant data. In particular, the delay need not be constant, which allows interruptions to occur in the supply of data in response to a request. Either end may cease or interrupt the flow of requests or data, and alignment between requests and data can still be preserved.

Since no particular timing relationship is required between the source and the destination, the propagation delay can be considerably greater than the clock period of the system, being limited principally by the need to keep skew in the cables forming lines between the units acceptable levels. Hence the system is especially suited for systems using a relatively high clock rate where it is desired not to keep the parts of the system close together. As has been explained, the system can if desired transfer data at a rate equal to the clock rate.

MODIFICATIONS

It is possible to operate without using the start and last signals, each request simply being fulfilled with a data word, if checking of block-length alignment is not required. Thus the system can operate either in a stream mode not divided into blocks, or in a single-shot mode where individual words are passed.

The de-dither circuit 31 is required because of the arbitrary phase relationship between the outgoing REQUEST-CLOCK and the incoming DATA-CLOCK signal. It is this last clock which clocks START-LOCAL and ENABLE-REQUESTS-LOCAL out of the write in control circuit 70, and with which the ENABLE-REQUESTS signal is synchronized. If the length of the cables takes one of a series of lengths correctly related to the frequency of the clock signal to be used the phase relationship can be controlled and the circuit 31 omitted.

For an interface unit that will both recieve and send, the control circuits must be duplicated, but the connections themselves, with suitable multiplexing, need not all be duplicated. Thus, if the interface units of FIG. 3 are to be capable of transmitting data in the reverse direction to that shown, the data lines 5 can conveniently be made bi-directional. A duplicate of the line 22 must be provided if it is not bi-directional, to carry an ENABLE-REQUEST-CLOCK signal from the interface unit 1a (now the source) to the interface unit 1b (now the destination). However, the functions of the lines 23 and 24 can simply be interchanged. Thus, for operation in the reverse direction, the line 24 carries the REQUEST-CLOCK signal and a connection in the interface unit 1a causes it to be returned on the line 23 as the DATA-CLOCK signal. Similarly the significance of the two sets of qualifier lines can be interchanged so that the lines 58 to 60 carry the request qualifiers and the lines 35 to 37 the data qualifiers. A duplicate of the line 32 must be provided if it is not bi-directional.

I claim:

1. A method of transferring information from a source unit to a destination unit, comprising:
   providing a reference clock signal in the destination unit,
   transmitting a clock signal synchronized with the reference clock signal from the destination unit to the source unit over a first clock-signal path,
   receiving the clock signal transmitted over the first clock signal path at the source unit and retransmitting a clock signal synchronized with it from the source unit to the destination unit over a second clock signal path,
   transmitting a data request signal from the destination unit to the source unit, the data request signal being synchronized with said reference clock signal,
   detecting the receipt of the data request signal at the source unit at a time synchronized with the clock signal received at the source unit from the first clock signal path and in response to that detection and synchronized with the clock signal received from the first clock signal path transmitting from the source unit to the destination unit both a signal indicating transmission and a data signal, and
   detecting in the destination unit at a time synchronized with the clock signal received from the second clock signal path the said signal indicating data transmission and in response to that detection registering the data signal.

2. A data transfer system for transmitting data from a source unit to a destination unit and comprising:
   first interface apparatus for the source unit,
   second interface apparatus for the destination unit, and
   a plurality of signal paths interconnecting the said first interface apparatus and second interface apparatus which plurality of signal paths comprises
   a first clock signal path,
   a second clock signal path,
   a data request signal path,
   a path for a signal indicating data transmission, and
   a data signal path,
   the second interface apparatus for the destination unit comprising
      means providing a reference clock signal,
      means coupled to the last-mentioned means for transmitting onto the first clock signal path a clock signal derived from the reference clock signal,
      means operating under timing control derived from the reference clock signal for outputting a data request signal onto the data request signal path,
      means coupled to the path for the signal indicating data transmission and operating under timing control derived from the clock signal received from the second clock signal path for detecting the signal indicating data transmission and arranged in response thereto to output a control signal, and
      means coupled to the data signal path and responsive to the said control signal to register data received on the said data signal path under timing control derived from the signal received from the second clock signal path, and
   the first interface apparatus for the source unit comprising,
      means coupled to the first clock signal path receiving the clock signal transmitting over that path,
      means coupled to the last-mentioned means for transmitting over the second clock signal path a clock signal derived from the clock signal received from the first clock signal path,
      means coupled to the data request signal path and operating under timing control derived from the clock signal received from the first clock signal path for detecting a data request and outputting a control signal or signals in response thereto,
      means responsive to a said control signal from the detecting means for outputting signals indicating data transmission over the path therefor under timing control derived from the clock signal received from the first clock path, and
      means responsive to a said control signal from the detecting means for outputting a data signal over the data signal path under timing control derived from the clock signal received from the first clock signal path.

3. A data transfer system as claimed in claim 2 in which the first interface apparatus is operable to transmit a further control signal to the second interface apparatus to enable the second interface apparatus to output said data request signal.

4. A data transfer system as claimed in claim 2 in which the means for outputting a data request signal also outputs signals indicating the start and end of data sequences to be transferred from the source to the destination unit.

5. A data transfer system as claimed in claim 2 in which the means for outputting signals indicating data transmission also outputs signals indicating the start and end of data being transferred to the destination unit.

6. A data transfer system as claimed in claim 2 in which the first interface apparatus includes means for storing an indication of requests for transfer of data which have not been fulfilled and further means responsive to said indication and to the availability of data for transfer to effect fulfillment of said requests for transfer of data.

* * * * *